United States Patent [19]
Nishimura

[11] Patent Number: 6,031,309
[45] Date of Patent: Feb. 29, 2000

[54] ELECTROMAGNET CLUTCH

[75] Inventor: Kozo Nishimura, Akashi, Japan

[73] Assignee: Mita Industrial Co., Ltd., Osaka-fu, Japan

[21] Appl. No.: 09/018,120

[22] Filed: Feb. 3, 1998

Related U.S. Application Data

[62] Division of application No. 08/635,086, Apr. 19, 1996, Pat. No. 5,762,173.

[30] Foreign Application Priority Data

| Apr. 25, 1995 | [JP] | Japan | 7-101459 |
| Apr. 25, 1995 | [JP] | Japan | 7-101460 |
| Apr. 25, 1995 | [JP] | Japan | 7-101461 |

[51] Int. Cl.[7] .......................... H02K 49/00; F16D 13/60; F16D 27/12
[52] U.S. Cl. ........................ 310/92; 310/103; 192/84.961
[58] Field of Search .................... 310/92, 103; 192/84.1, 192/84.9, 84.951, 84.96, 84.961

[56] References Cited

U.S. PATENT DOCUMENTS

| 3,854,562 | 12/1974 | Wilczewski | 192/84.961 |
| 4,569,426 | 2/1986 | Sekella et al. | 192/84.961 |
| 4,664,238 | 5/1987 | Nishino et al. | 192/84.961 |
| 4,804,874 | 2/1989 | Nakamura | 310/92 |
| 5,080,214 | 1/1992 | Fossum | 192/84.961 |
| 5,147,902 | 9/1992 | Nakamura | 192/84.961 |

*Primary Examiner*—Clayton LaBalle
*Attorney, Agent, or Firm*—Jordan and Hamburg LLP

[57] ABSTRACT

An electromagnetic clutch includes a field member having a hollow in a center thereof and carrying a field coil in the form of a ring, a shaft rotatably placed in the hollow of the field member, a rotor member fixedly attached on the shaft, the rotor member being arranged on one side of the field member, a driving member rotatably mounted on the shaft, the driving member being arranged on one side of the rotor member, and an armature member attached to the driving member, the armature member being arranged between the rotor member and the driving member and bendable toward the rotor member. The shaft is provided with an inner cylinder member made of a synthetic resin and formed with a hollow extending along an axis thereof, the hollow being operable to engage with a torque transmission shaft of a device to be connected with the electromagnetic clutch and having an irregular shape portion for keeping the torque transmission shaft to rotate together with the inner cylinder member, and an outer cylinder member placed over the inner cylinder member, the outer cylinder member being made of a metallic material having magnetism.

18 Claims, 11 Drawing Sheets

ELECTROMAGNET CLUTCH

This is a division of application Ser. No. 08/635,086, filed Apr. 19, 1996, now U.S. Pat. No. 5,762,173.

BACKGROUND OF THE INVENTION

This invention relates to an electromagnetic clutch.

Generally, an electromagnetic clutch is constructed as shown in FIG. 20. In FIG. 20, indicated at 100 is an electromagnetic clutch used in a copy paper feeding mechanism of a copying machine and the like. The electromagnetic clutch 100 has a field member 102 formed with a cylindrical hollow 101 along an axis of the field member 102. A hollow shaft 103 is rotatably inserted in the hollow 101. The field member 102 is provided a bobbin 104 therein. The bobbin 104 is wound with a field coil 105.

A rotor 107 is fixedly secured to the hollow shaft 103. The rotor 107 is formed with a number of through holes. A driving member 109 formed with teeth is rotatably mounted on the hollow shaft 103. Further, an armature member 108 is attached to the driving member 109 by way of a disc spring 110. The armature member 108 is rotatable with respect to the hollow shaft 103.

The hollow shaft 103 is formed with grooves 111, 112 at both ends thereof. Fastening ring members 113, 114 are fitted in the grooves 111, 112 to hold the field member 102, the rotor 107, and the driving member 109 from slipping off from the hollow shaft 103. Among the parts constituting the electromagnetic clutch, at least the field member 102, the hollow shaft 103, the rotor 107, and the armature member 108 are made of a material having magnetism, such as ferrous material.

The thus constructed electromagnetic clutch 100 is operated as follows. The driving member 109 is rotated about the hollow shaft 103 driven by an unillustrated drive source. Specifically, when an electric current is flowed in the coil 105, magnetic flux generates along the field member 102, the hollow shaft 103, and the rotor 107. The armature member 108 is attracted onto the rotor 107 by leakage flux passing through the holes of the rotor 106 against a biasing force of the spring 110. Accordingly, the rotor 107 is rotated together with the driving member 109, and the hollow shaft 103 is also rotated together with the rotor 107 since the rotor 107 is fixedly secured to the hollow shaft 103.

On the other hand, when the supply of electric current is stopped, the coil 105 is deenergized, and the flux disappears. Hence, the magnetic attraction force of the rotor 107 also disappears. As a result, the armature member 108 is returned to the initial state where the armature member 108 is biased toward the driving member 109 by the biasing force of the spring 110 and is away from the rotor 107. Consequently, although the driving member 109 is rotating, the hollow shaft 103 does not rotate further.

The hollow shaft 103 is formed with a hollow along an axis of the hollow shaft 103. As shown in FIG. 21, the hollow formed in the hollow shaft 103 has a D-shaped hollow section in an end of a portion over which the field member 102 is provided. In the hollow of the hollow shaft 103 is inserted a shaft constituting the copy paper feeding mechanism. The shaft has in one end thereof a D-shaped section in correspondence to the D-shaped hollow section of the hollow shaft 103. With this arrangement, the rotational force of the hollow shaft 103 of the clutch 100 is transmitted to the shaft of the copy paper feeding mechanism. The D-shaped section engagement ensures an integral rotation of the hollow shaft 103 and the shaft of the copy paper feeding mechanism.

It has been cumbersome to produce the hollow shaft 103 by machining a metal rod due to the presence of the D-shaped hollow section. For this reason, the hollow shaft 103 has been produced by filling powder having magnetic particles in a mold having a molding space in agreement to the hollow shaft 103, and sintering it at a high temperature, and forming the grooves 111, 112 in two ends of the sintered shaft by machining.

However, such hollow shaft production method requires many processes, such as molding and sintering. Further, the shaft inevitably suffers a deformation in the sintering process due to an irregularity in the density of powder in the molding process. Accordingly, it has been necessary to grind the sintered shaft into the specified shape. The production cost of hollow shafts has been considerably high. This has inevitably increased the whole production costs of electromagnetic clutch.

In the conventional electromagnetic clutch 100, the rotor 107 is constructed as shown in FIGS. 22 and 23. FIG. 22 is a front view of the rotor 107, and FIG. 23 is a side view in section of the rotor 107.

The rotor 107 is formed with a through hole 1071 in a center thereof, a circular recess 1072 in one side thereof, and an annular groove 1073 in the same side. The annular groove 1073 has a greater depth than the circular recess 1072. The terminal end wall of the annular groove 1073 is formed with through holes 1074, 1075 and 1076, each having the form of an arc.

In other words, the rotor 107 is coaxially formed with an inner annular projection 1077 and an outer annular projection 1078 on the one side. The inner and outer annular projections 1077 and 1078 are formed in a concentric manner. The side of the rotor 107 where the projections 1077 and 1078 are formed faces the armature member 108, while the other side of the rotor 107 faces the field member 102. With this construction, when the coil 105 is energized, the armature member 108 is attracted on the rotor 107 by leakage magnetic flux passing through the holes of the rotor 106.

The rotor 107 has the circular recess 1072, annular groove 1073, through holes 1074 to 1076, and is thus very complicated in construction. This has made it difficult to produce the rotor 107 at one time by press molding. Accordingly, the rotor has been produced by machining. However, the machining of the rotor needs a long time, which consequently makes it difficult to produce a large quantity of rotors in a short time, and to reduce the production cost of rotors. This has inevitably increased the whole production costs of electromagnetic clutch.

For electromagnetic clutches, further, there has been the demand that when the field coil is deenergized, the hollow shaft always stops and keeps at a fixed position. For example, in the case where an electromagnetic clutch is used in a copy paper feeding mechanism, an error in the stop position results in a failure in the copy paper feeding, e.g., feeding copy paper beyond a predetermined position. Also, if the stop position is not maintained, there is a likelihood that copy paper is not reliably nipped by next roller pairs, e.g., registration roller pair which performs a secondary feeding operation.

To solve this problem, the electromagnetic clutch may be provided with a braking member. However, the provision of a braking member causes the construction and production more complicated, which accordingly makes it difficult to reduce the production costs of electromagnetic clutch.

SUMMARY OF THE INVENTION

It is an object of the present invention to provide an electromagnetic clutch which has overcome the problems residing in the prior art.

It is another object of the present invention to provide a method for producing a rotor for use in an electromagnetic clutch which has overcome the problems residing in the prior art.

It is another object of the present invention to provide an electromagnetic clutch which makes it possible to be produced with more ease and at a reduced production cost.

The present invention is directed to an electromagnetic clutch comprising: a field member having a hollow in a center thereof and carrying a field coil in the form of a ring; a shaft rotatably placed in the hollow of the field member, the shaft including: an inner cylinder member made of a synthetic resin and formed with a hollow extending along an axis thereof, the hollow being operable to engage with a torque transmission shaft of a device to be connected with the electromagnetic clutch and having an irregular shape portion for keeping the torque transmission shaft to rotate together with the inner cylinder member; an outer cylinder member placed over the inner cylinder member, the outer cylinder member being made of a metallic material having magnetism; a rotor member fixedly attached on the outer cylinder member, the rotor member being arranged on one side of the field member; a driving member rotatably mounted on the outer cylinder member, the driving member being arranged on one side of the rotor member; and an armature member attached to the driving member, the armature member being arranged between the rotor member and the driving member and bendable toward the rotor member.

With this electromagnetic clutch, the shaft is constructed by the inner cylinder member and the outer cylinder member. The inner cylinder member having the irregular shape portion is made of a synthetic resin. The outer cylinder member is made of metallic material. Accordingly, sintering or machining process is not necessary, which makes it easy to produce a shaft for electromagnetic clutch and thus electromagnetic clutch. Hence, the production costs of electromagnetic clutch can be reduced.

The inner cylinder member may be formed with a projection at a specified position on an outside surface thereof. The outer cylinder member may be formed with a hole in a periphery wall thereof, the hole being engageable with the projection when placed over the inner cylinder member.

It may be appreciated that the inner cylinder member is longer than the outer cylinder member, the inner cylinder member including an exposed portion extending beyond an end edge of the outer cylinder member when the outer cylinder member is placed over the inner cylinder member and formed with a groove, and being provided with a fastening member placed in the groove.

Also, the present invention is directed to an electromagnetic clutch comprising: a field member having a hollow in a center thereof and carrying a field coil in the form of a ring; a shaft rotatably placed in the hollow of the field member; a rotor member fixedly attached on the shaft, the rotor member being arranged on one side of the field member, the rotor member including an inner member in the form of a ring and an outer member in the form of a ring, the outer member being larger than the inner member; a driving member rotatably mounted on the shaft, the driving member being arranged on one side of the rotor member; and an armature member attached to the driving member, the armature member being arranged between the rotor member and the driving member and bendable toward the rotor member.

With this electromagnetic clutch, the rotor member is constructed by the inner member and the outer member larger than the inner member. They can be individually formed. Accordingly, the rotor can be produced at a reduced cost. This will make the production of electromagnetic clutch easier, and thus reduce the production costs.

The inner member may be formed with a through hole in a center thereof, a first annular projection along an outer periphery on one side surface thereof, and a second annular projection along a periphery of the through hole on the other side surface thereof. The outer member may be formed with an annular wall along an outer periphery thereof, and a through hole in a center thereof, the through hole of the outer member being engageable with the second annular projection of the inner member, and formed with a hole between the through hole and the annular wall. Also, the inner member and the outer member may be fixedly connected with each other by deforming the second annular projection of the inner member.

Also, an electromagnetic clutch of the present invention comprising: a field member having a hollow in a center thereof and carrying a field coil in the form of a ring; a shaft rotatably placed in the hollow of the field member; a rotor member fixedly attached on the shaft, the rotor member being arranged on one side of the field member; a driving member rotatably mounted on the shaft, the driving member being arranged on one side of the rotor member; an armature member attached to the driving member, the armature member being arranged between the rotor member and the driving member and bendable toward the rotor member; and a brake member fixedly secured to the field member and operable to come into contact with the rotor member.

With this electromagnetic clutch, there is provided the brake member operable to come into contact with the rotor member. The rotation of the rotor can be reliably controlled in a simple construction.

The brake member may be constructed by a mounting portion to be mounted on the field member and a contact portion operable to come into contact with the rotor member. Further, the field member may be further provided with a pusher member operable to push the brake member toward the rotor member.

The present invention is directed to a shaft for use in an electromagnetic clutch, comprising an inner cylinder member made of a synthetic resin and formed with a hollow extending along an axis thereof, the hollow being operable to engage with a torque transmission shaft of a device to be connected with the electromagnetic clutch and having an irregular shape portion for keeping the torque transmission shaft to rotate together with the inner cylinder member, and an outer cylinder member placed over the inner cylinder member, the outer cylinder member being made of a metallic material having magnetism.

The shaft is constructed by the inner cylinder member and the outer cylinder member. They can be individually formed, which ensures easier production. Accordingly, the production costs of shaft for electromagnetic clutch can be remarkably reduced.

The inner cylinder member may be formed with a projection at a specified position on an outside surface thereof. The outer cylinder member may be formed with a hole in a periphery wall thereof, the hole being engageable with the hole when placed over the inner cylinder member.

The inner cylinder member may be longer than the outer cylinder member so that the inner cylinder member has an exposed portion extending beyond an end edge of the outer cylinder member when the outer cylinder member is placed over the inner cylinder member. The exposed portion is formed with a groove and a fastening member is placed in the groove.

Further, the present invention is directed to a rotor for use in an electromagnetic clutch, comprising: an inner member in the form of a ring and an outer member in the form of a ring, the outer member being larger than the inner member; the inner member being formed with a through hole in a center thereof, a first annular projection along an outer periphery on one side surface thereof, and a second annular projection along a periphery of the through hole on the other side surface thereof; the outer member being formed with an annular wall along an outer periphery thereof, and a through hole in a center thereof, the through hole of the outer member being engageable with the second annular projection of the inner member in a state that the inner member is placed in a space defined by the annular wall of the outer member, the outer member being formed with a hole between the annular wall and the through hole.

The rotor is constructed by the inner member and the outer member. Accordingly, they can be individually formed, which makes the production of rotor for electromagnetic clutch easier. Thus, the production costs of electromagnetic clutch can be remarkably reduced.

The inner member and the outer member may be fixedly connected with each other by deforming the second annular projection of the inner member.

Moreover, the present invention is directed to a method for producing a rotor for use in an electromagnetic clutch, comprising the steps of: making an inner member in the form of a ring having a center hole in a center thereof, a first annular projection along an outer periphery on one side surface thereof, and a second annular projection along a periphery of the through hole on the other side surface thereof; making an outer member in the form of a ring having an annular wall along an outer periphery thereof, a center hole in a center thereof, and a hole between the center hole and the annular wall, the center hole engageable with the second annular projection of the inner member, the outer member being larger than the inner member; and connecting the inner member and the outer member with each other by arranging the inner member in a space defined by the annular wall of the outer member and placing the second annular projection of the inner member in the center hole of the outer member.

Also, the present invention is directed to a method for producing a rotor for use in an electromagnetic clutch, comprising the steps of: making an inner member in the form of a ring having a center hole in a center thereof, a first annular projection along an outer periphery on one side surface thereof, and a second annular projection along a periphery of the center hole on the other side surface thereof; making an outer member in the form of a ring having an annular wall along an outer periphery thereof, and a center hole in a center thereof, the center hole engageable with the second annular projection of the inner member, the outer member being larger than the inner member; connecting the inner member and the outer member with each other by arranging the inner member in a space defined by the annular wall of the outer member and placing the second annular projection of the inner member in the center hole of the outer member; and forming a hole in the outer member at a position between the annular wall and the center hole of the outer member.

Further, the present invention is directed to a method for producing a rotor for use in an electromagnetic clutch, comprising the steps of: shaping a disc plate having a center hole in a center thereof into an inner member a first annular projection along an outer periphery on one side surface thereof, and a second annular projection along a periphery of the center hole on the other side surface thereof; shaping a plate into a preliminary outer member in the form of a disc having an annular wall, and forming a center hole in a center of the preliminary outer member, the center hole engageable with the second annular projection of the inner member to make an outer member, the outer member being larger than the inner member; connecting the inner member and the outer member with each other by arranging the inner member in a space defined by the annular wall of the outer member and placing the second annular projection of the inner member in the center hole of the outer member; and forming a hole in the outer member at a position between the annular wall and the center hole of the outer member.

Further, the present invention is directed to a method for producing a rotor for use in an electromagnetic clutch, comprising the steps of: shaping a disc plate into a preliminary inner member having a first annular projection along an outer periphery on one side surface thereof and a center projection on the other side surface in a center thereof, and forming a center hole in the center projection of the preliminary inner member to make an inner member; shaping a plate into a preliminary outer member in the form of a disc having an annular wall, and forming a center hole in a center of the preliminary outer member, the center hole engageable with the center projection of the inner member to make an outer member, the outer member being larger than the inner member; connecting the inner member and the outer member with each other by arranging the inner member in a space defined by the annular wall of the outer member and placing the center projection of the inner member in the center hole of the outer member; and forming a hole in the outer member at a position between the annular wall and the center hole of the outer member.

Further, the present invention is directed t o a method for producing a rotor for use in an electromagnetic clutch, comprising the steps of: shaping a disc plate having a center hole in a center thereof into an inner member having a first annular projection along an outer periphery on one side surface thereof and a second annular projection on the other side surface along a periphery of the center hole; shaping a plate into a preliminary outer member in the form of a disc having an annular wall, and forming a center hole in a center of the preliminary outer member, the center hole engageable with the second annular projection of the inner member to make an outer member, the outer member being larger than the inner member; connecting the inner member and the outer member with each other by arranging the inner member in a space defined by the annular wall of the outer member and placing the center projection of the inner member in the center hole of the outer member; and forming a hole in the outer member at a position between the annular wall and the center hole of the outer member.

Further, the present invention is directed to a method for producing a rotor for use in an electromagnetic clutch, comprising the steps of: forming a center hole in a center of a disc plate; shaping the disc plate into an inner member having a first annular projection along an outer periphery on one side surface thereof and a second annular projection on the other side surface along a periphery of the center hole; shaping a plate into a preliminary outer member in the form of a disc having an annular wall, and forming a center hole in a center of the preliminary outer member, the center hole engageable with the second annular projection of the inner member to make an outer member, the outer member being larger than the inner member; connecting the inner member and the outer member with each other by arranging the inner member in a space defined by the annular wall of the outer member and placing the center projection of the inner member in the center hole of the outer member; and forming a hole in the outer member at a position between the annular wall and the center hole of the outer member.

A plating layer may be formed over an entire exposed surface of the inner member and the outer member.

Further, the present invention is directed to a method for producing a rotor for use in an electromagnetic clutch, comprising the steps of: forming a center hole in a center of a disc plate; shaping the disc plate into an inner member having a first annular projection along an outer periphery on one side surface thereof and a second annular projection on the other side surface along a periphery of the center hole; coating a plating layer over an exposed entire surface of the inner member; shaping a plated plate into a preliminary outer member in the form of a disc having an annular wall, and forming a center hole in a center of the preliminary outer member, the center hole engageable with the second annular projection of the inner member to make an outer member, the outer member being larger than the inner member; connecting the inner member and the outer member with each other by arranging the inner member in a space defined by the annular wall of the outer member and placing the center projection of the inner member in the center hole of the outer member; and forming a hole in the outer member at a position between the annular wall and the center hole of the outer member.

The inner member and the outer member may be fixedly connected with each other by deforming the second annular projection of the inner member.

In these production methods, the inner member and the outer member for the rotor are separately made. The production of rotor can be simplified, which thus reduces the production costs of rotor. Also, the hole can be easily formed in the outer member. Further, the plating of the inner member can be easily accomplished.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
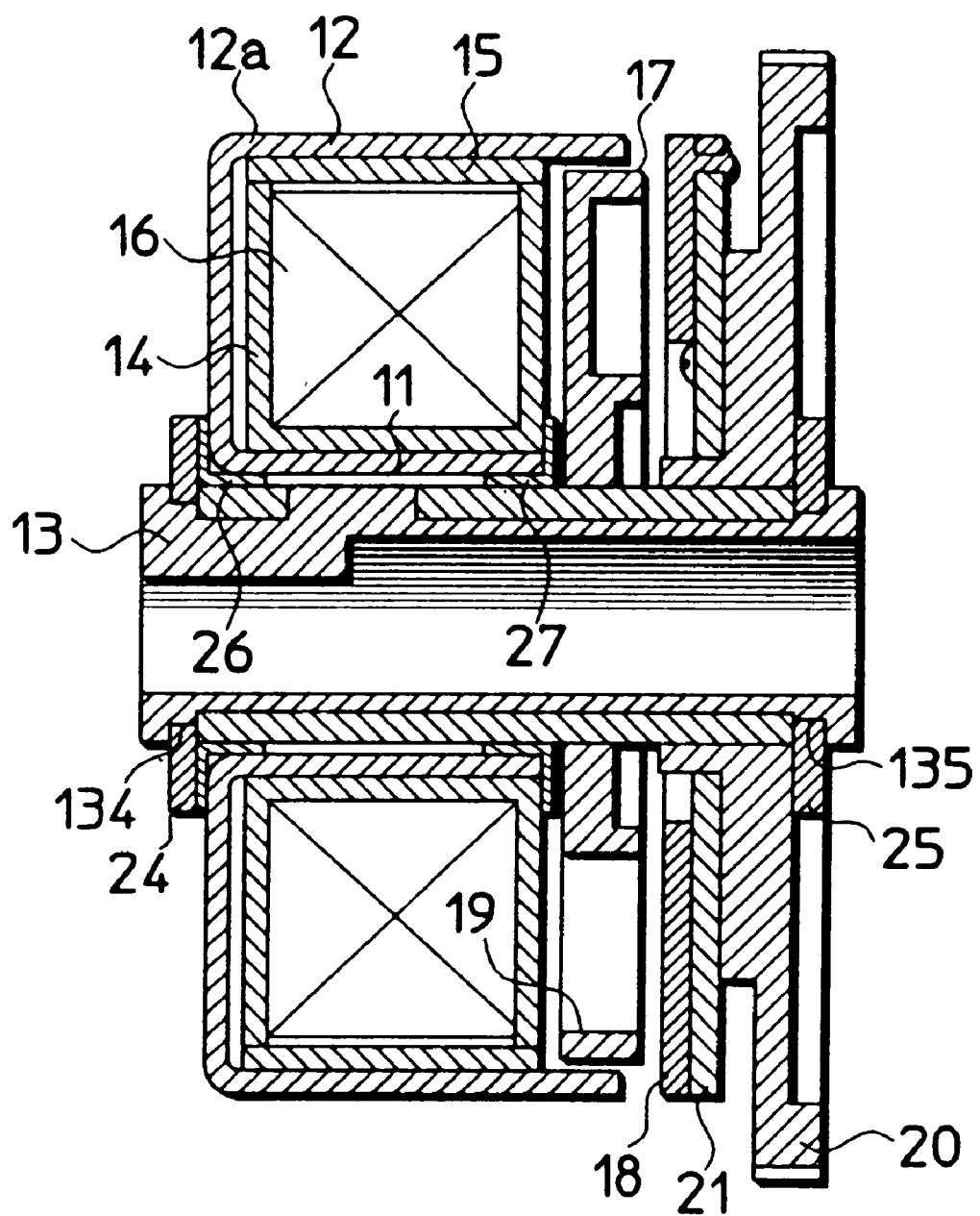
FIG. 1 is a cross sectional view of an electromagnetic clutch as a first embodiment according to the present invention.

FIG. 1 is a vertical cross sectional view of an electromagnetic clutch as a first embodiment of the present invention. In FIG. 1, indicated at 10 is an electromagnetic clutch. The clutch 10 has a field member 12 including a hollow portion 11. The field member 12 includes a casing 12a and a field coil 16 wound on a bobbin 14 placed in the casing 12a. The hollow portion 11 has a cylindrical shape extending along an axis of the field member 12. A hollow shaft 13 is rotatably placed in the hollow portion 11. The bobbin 14 is made of an insulating material. An outer periphery of the coil 16 is covered with an insulator 15 in the form of a sheet. The coil 105 is energized to generate magnetic flux.

A rotor 17 is fixedly secured to the shaft 13. Also, an armature member 18 is rotatably mounted on the shaft 13. The rotor 17 is formed with holes 19 in a peripheral end portion thereof. A driving member 20 formed with teeth is rotatably mounted on the shaft 13. The armature member 18 and the driving member 20 are integrally connected with each other. The armature member 18 is biased toward the driving member 20 by a disc spring 21.

The shaft 13 is formed with grooves 134, 135 in both ends thereof in which stopper rings 24 and 25 are fitted to hold the field member 12, rotor 17, the armature member 18 and the driving member 20 from slipping off from the shaft 13. Bearings 26, 27 are provided on both ends of the hollow portion 11.

Figure 2:
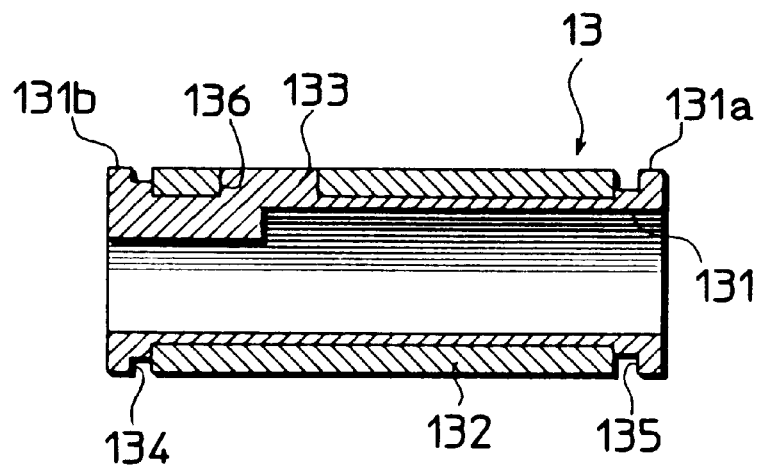
FIG. 2 is a cross sectional view of a shaft incorporated in the first electromagnetic clutch shown in FIG. 1.
Figure 3:
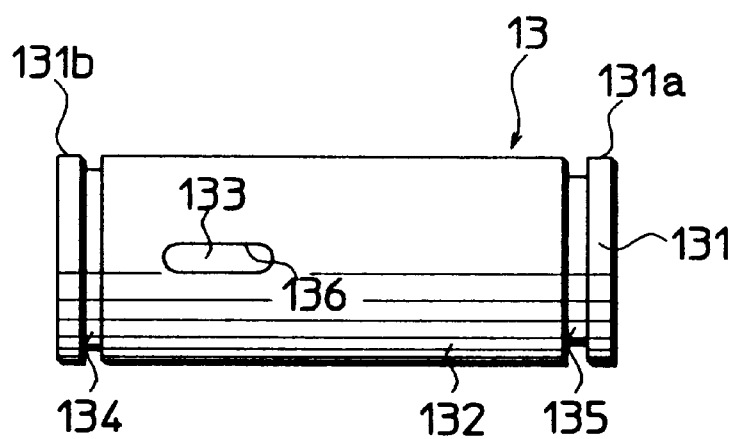
FIG. 3 is a side view showing an external appearance of the shaft shown in FIG. 2.

Among the parts constituting the electromagnetic clutch, at least the field member 12, rotor 17, and armature member 18 are made of a material having magnetism, such as ferrous material. As shown in FIGS. 2 and 3, the shaft 13 includes a inner hollow cylinder 131 made of synthetic resin and a outer hollow cylinder 132 made of metallic material having magnetism. The outer hollow cylinder 132 is arranged on an outside of the inner hollow cylinder 131.

An end portion of the hollow of the inner hollow cylinder 131 made of synthetic resin is formed into a D-shape while the remaining portion of the hollow of the inner hollow cylinder 131 is formed into a cylindrical shape. Further, the inner hollow cylinder 131 is formed with end annular projections 131a and 131b at both ends of the periphery thereof. Also, the inner hollow cylinder 131 is formed with an elongated projection 133 at the position of the periphery intersecting the joining plane of the D-shaped portion and the cylindrical portion of the hollow thereof. The arrangement of the elongated projection 133 over the joining plane increases the strength at the portion of the inner hollow cylinder where a stress concentration is likely to occur.

On the other hand, the outer hollow cylinder 132 made of metallic material is formed with an elongated through hole 136 at a position corresponding to the elongated projection 133. When the outer hollow cylinder 132 is placed over the inner hollow cylinder 131, the elongated projection 133 engages the elongated hole 136 and they are thus reliably integrated with each other. It may be appreciated to form in an inner wall of the outer hollow cylinder 132 a recess at a position corresponding to the elongated projection 133 instead of the through hole 136. The inner and outer hollow cylinders 131 and 132, made of different materials, are rotated as one body. Also; the combination of the inner and outer hollow cylinders 131 and 132 provides the necessary thickness, and ensure the sufficient strength and the durability as a shaft for the electromagnetic clutch.

Also, the inner hollow cylinder 131 is made to have so longer than the outer hollow cylinder 132 that the end annular projections 131a and 131b of the inner hollow cylinder 131 and the both end surfaces of the outer hollow cylinder 132 define the grooves 134 and 135.

The shaft 13 is produced by attaching the outer hollow cylinder 132 to an inner wall of an outside mold member of a mold, inserting an inside mold member in the outer hollow cylinder 132 to define a molding space to form the inner hollow cylinder 131, and filling synthetic resin into the molding space. This production manner is remarkably easier comparing to the conventional production manner.

In thus produced shaft 13, the inner hollow cylinder 131 having the D-shaped hollow portion for engaging a torque transmission shaft, e.g., rotary shaft of a feeding roller, is made of synthetic resin. The outer hollow cylinder 132, along which magnetic flux is induced, is made of metallic material having magnetism. Accordingly, the shaft 13 of the present invention serves the identical function as the conventional sintered shaft. However, compared to the sintered shaft, it is advantageous in that the shaft 13 of the present can be produced with the use of an inexpensive material and a simplified production manner, which results in reducing the production costs of shaft and electromagnetic clutches.

Figure 4:
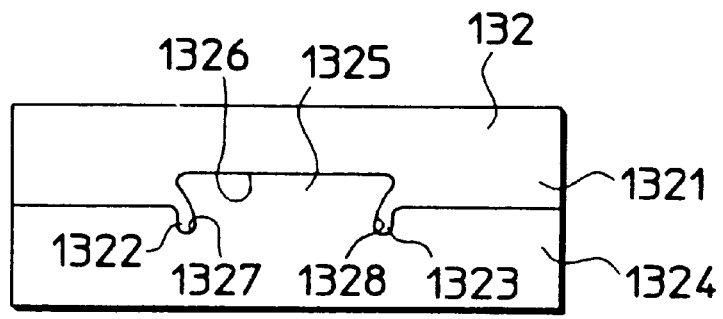
FIG. 4 is a side view showing an external appearance of an outer hollow cylinder constituting the shaft.

The outer hollow cylinder 132 may be shaped by cutting a metal pipe into a specified length. Alternatively, the outer hollow cylinder 132 may be shaped by bending a metal plate, such as zinc plated steel plate, into a cylindrical shape, and connecting both ends of the bent article with each other as shown in FIG. 4. More specifically, one end 1321 of the bent particle is formed with a pair of small projections 1322 and 1323 and a large recess 1326. The other end 1324 of the bent article is formed with a large projection 1325 corresponding to the large recess 1326 of the one end 1321 and a pair of small recesses 1327, 1328 corresponding to the small projections 1322, 1323 of the one end 1321. The one end 1321 and the other end 1324 are jointed to each other by fitting the small projections 1322, 1323 in the small recesses 1327, 1328, and the large projection 1325 in the large recess 1326, respectively.

Figure 5:
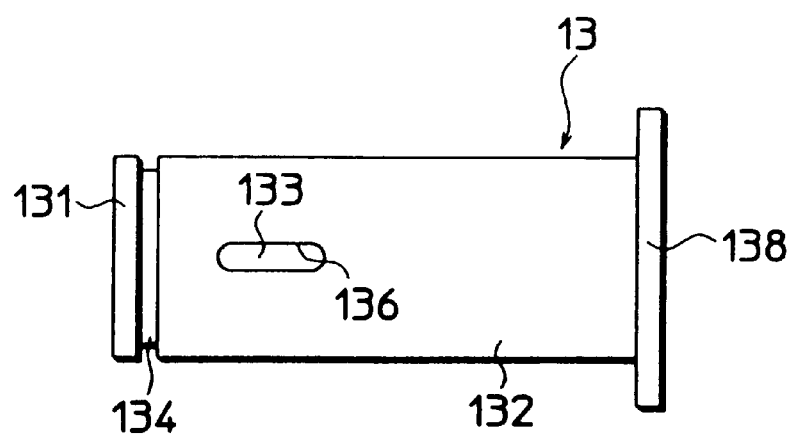
FIG. 5 is a side view showing an external appearance of a shaft as a modification.

Further, it may be appreciated to form a groove 134 in one end of a shaft 13 and a flange 138 on the other end of the shaft 13 as shown in FIG. 5. The flange 138 serves as a stopper in place of the stopper ring 25, which reduces the number of parts of an electromagnetic clutch.

Further, it may be appreciated that one of the stopper grooves 134 and 135 is formed in one end of the outer hollow cylinder 132 and the other groove is defined by an end surface of the other end of the outer hollow cylinder 132 and a projection formed on an end of the inner hollow cylinder 131. Furthermore, it may be appreciated that the outer hollow cylinder 132 is made to have the same length as the inner hollow cylinder 131 and is formed with stopper grooves 134 and 135 in both ends of the outer hollow cylinder 132.

Moreover, the hollow of the inner hollow cylinder 131 may be formed with a triangular shape section, rectangular shape section, elliptical shape section or any other shaped section, instead of the D-shape section, as far as it reliably assures the integral rotation of the shaft 13 and a driven shaft. Further, the inner hollow cylinder 131 may be formed with the integral rotation means over the entire length of the inner hollow cylinder 131.

Further, it may be appreciated to form a plurality of projections 133 on the inner hollow cylinder 131 and the corresponding number of holes or recesses 136 in the outer hollow cylinder 132. The stopper grooves 134, 135 may be formed by the use of a lathe machine. Further, the integral rotation of the inner hollow cylinder 131 and the outer hollow cylinder 132 may be accomplished by applying an adhesive agent between the cylindrical bodies 131 and 132, in place of fitting the projection 133 to the hole 136.

In the thus constructed electromagnetic clutch 10, the driving member 20 is rotated about the shaft 13 by an unillustrated drive source. Specifically, when electric current is flowed in the coil 16, a flux of magnetic induction is generated around the energized coil 16 and along a magnetic path defined by the outer hollow cylinder 132 of the shaft 13 and the rotor 17. The rotor 17 attracts the armature member 18 against the biasing force of the spring 21 by leakage flux passing through the holes 19. In this time, if the armature member 18 rotates together with the driving member 20, the rotor 17 rotates together with the armature member 18, and the shaft 13 rotates together with the rotor 17 since the rotor 17 is fixedly secured to the shaft 13.

On the other hand, when the coil 16 is deenergized, the magnetic attraction of the rotor 17 disappears because the magnetic flux disappears from the coil 16. As a result, the armature member 18 is returned to the driving member 20 due to the biasing force of the spring 21 and is away from the rotor 17. Accordingly, even if the driving member 20 is kept rotating after the coil 16 is deenergized, the shaft 13 does not rotate.

In this way, the electromagnetic clutch 10 including the inventive shaft 13 can reliably perform the required functions.

Figure 6:
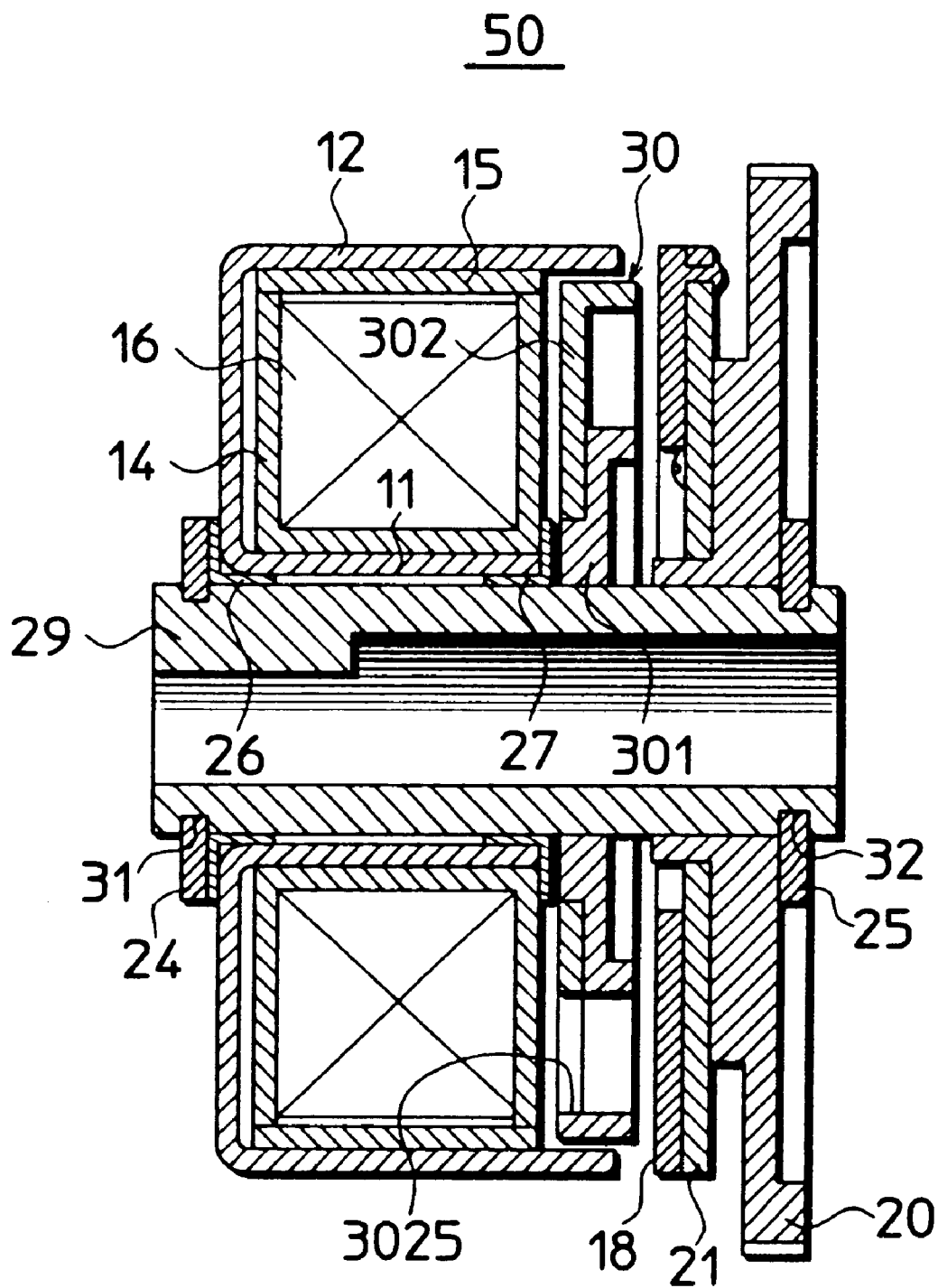
FIG. 6 is a cross sectional view of an electromagnetic clutch as a second embodiment according to the present invention.

FIG. 6 is a vertical cross sectional view of an electromagnetic clutch as a second embodiment of this invention. In FIG. 6, indicated at 50 is a second electromagnetic clutch. Since the electromagnetic clutch 50 has a construction basically identical to that of the electromagnetic clutch 10 in the first embodiment, the elements of the electromagnetic clutch 50 identical to those of the electromagnetic clutch 10 are indicated at the same reference numerals, and a detailed description of the elements common to the first and second embodiments is omitted.

The electromagnetic clutch 50 has a field member 12 including a hollow portion 11. A shaft 29 in the form of a cylinder is rotatably inserted in the hollow portion 11. A field coil 16 is wound around an outer circumference of the hollow portion 11. A rotor 30 is fixedly mounted on the shaft 29. An armature member 18 is rotatably mounted on the shaft 29. A driving member 20 is rotatably mounted on the shaft. The armature member 18 and the driving member 20 are integrally connected with each other by a spring 21.

The shaft 29 is formed with grooves 31, 32 in both ends thereof. Stopper rings 24 and 25 are fitted in the grooves 31, 32, respectively to prevent the parts from slipping off from the shaft 29. The hollow portion 11 of the filed member 12 is arranged with bearings 26, 27 on its both ends.

Figure 7:
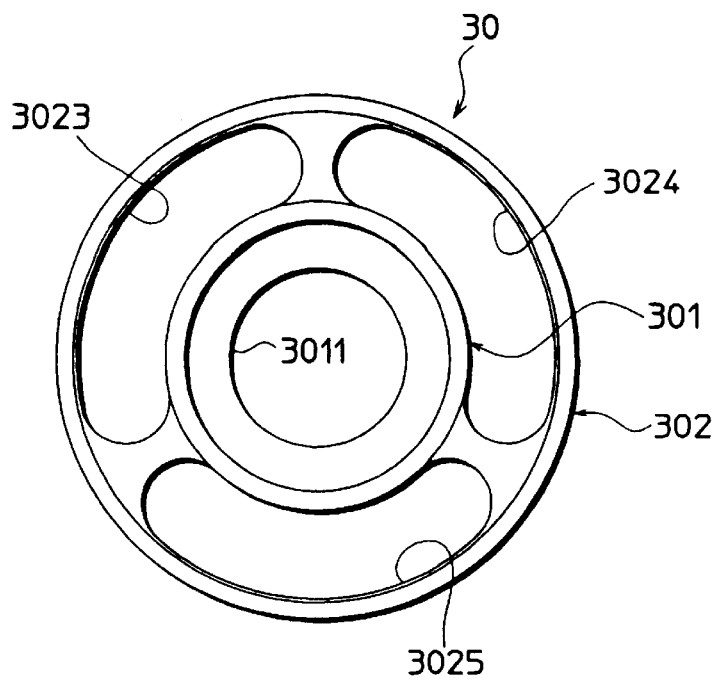
FIG. 7 is a front view of a rotor incorporated in the second electromagnetic clutch.
Figure 8:
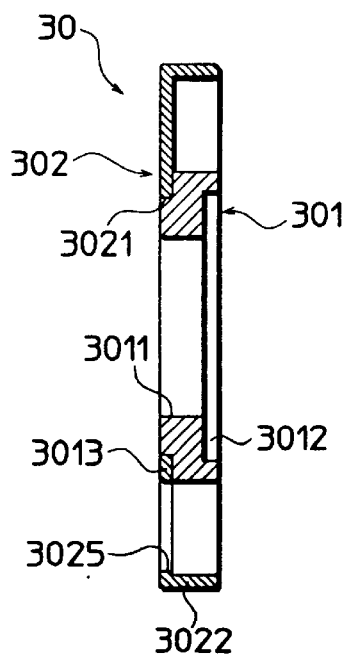
FIG. 8 is a cross sectional view of the rotor shown in FIG. 7.

As mentioned above, the electromagnetic clutch 50 has the construction basically identical to that of the electromagnetic clutch 10, but is different from the electromagnetic clutch 10 with respect to the shaft and rotor. Specifically, the hollow shaft 29 is formed by machining a single cylindrical article. The rotor 30 is constructed by an inner member 301 and an outer member 302 larger than the inner member 301 as shown in FIGS. 7 and 8. The inner member 301 and the outer member 302 each are in the form of a ring.

The inner member 301 is formed with a center hole 3011. Also, a first annular projection 3012 is formed on an outer periphery of one side of the inner member 301 and a second annular projection 3013 is formed on an inner periphery of the other side of the inner member 301. The outer member 302 is formed with a center hole 3021. The diameter of the center hole 3021 is identical to the outer diameter of the second annular projection 3013. Also, the outer member 302 is formed with an annular wall 3022 on a periphery thereof and three through holes 3023, 3024, and 3025 therein.

The rotor 30 is integrally constructed by arranging the inner member 301 in a space defined by the annular wall 3022 of the outer member 302 and fittingly placing the second annular projection 3013 of the inner member 301 in the center hole 3021 of the outer member 302.

Figure 9:
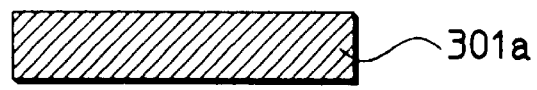
FIG. 9 is a cross sectional view of a preliminary inner member for an inner member constituting the rotor shown in FIGS. 7 and 8.
Figure 10:
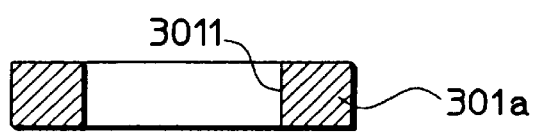
FIG. 10 is a cross sectional view of a preliminary inner member formed with a through hole.
Figure 11:
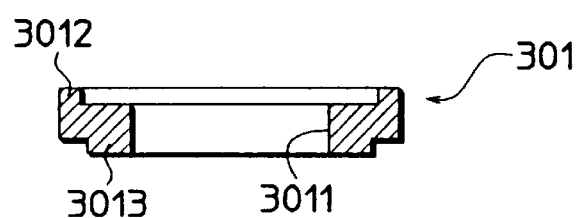
FIG. 11 is a cross sectional view of the inner member for the rotor produced by press molding.

The inner member 301 is produced as shown in FIGS. 9 to 11. First, as shown in FIG. 9, a preliminary inner member 301*a* made of metallic material having magnetism such as ferrous material is prepared by punching a plate into the specified disc. Next, as shown in FIG. 10, the preliminary inner member 301*a* is punched with a presser die to form a through hole 3011 in a center thereof. Then, the preliminary inner member 301*a* formed with the through hole 3011 is molded by press molding to form the first annular projection 3012 along the outer periphery on the one side and the second annular projection 3013 around the periphery of the through hole 3011 on the other side, as shown in FIG. 11. Consequently, the inner member 301 is produced.

Figure 12:
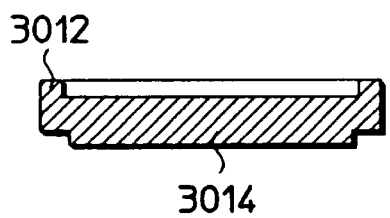
FIG. 12 is a cross sectional view of a preliminary inner member for another production method.

It may be appreciated to form the through hole 3011 at the same time as punching the plate into the specified disc in the stage of FIG. 9. Also, as shown in FIG. 12, without forming the through hole 3011 in the preliminary inner member 301*a*, the preliminary inner member 301*a* may be press-molded to form a first annular projection 3012 along an outer periphery of the one side thereof and a circular projection 3014 in a center of the other side. Thereafter, a through hole 3011 may be formed in a center of the preliminary inner member 301 to form a second annular projection 3013.

Figure 13:
FIG. 13 is a cross sectional view of a disc plate constituting an outer member constituting the rotor shown in FIGS. 7 and 8.
Figure 14:
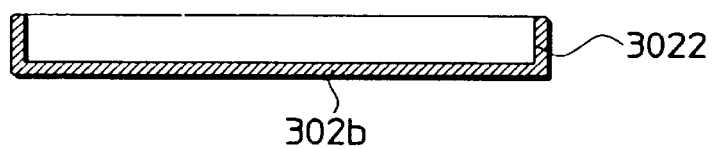
FIG. 14 is a cross sectional view of a preliminary outer member produced by press molding.
Figure 15:
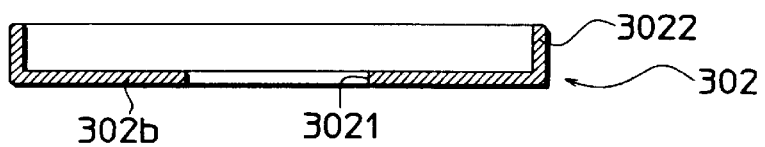
FIG. 15 is a cross sectional view of a preliminary outer member formed with a through hole in a center thereof.

The outer member 302 is produced as shown in FIGS. 13 to 15. First, a circular plate 302*a* made of metallic material having magnetism, such as ferrous material, is prepared as shown in FIG. 13. Then, as shown in FIG. 14, the disc plate 302*a* is press-molded to form an annular wall 3022 along an outer periphery thereof to obtain a preliminary outer member 302*b* having a diameter larger than the preliminary inner member 301*a*. As can be clearly seen from FIG. 14, the preliminary outer member 302*b* has a space defined by the annular wall 3022. Subsequently, the preliminary outer member 302*b* is punched in a center thereof with a die to form a through hole 3021 having a diameter to fit the second annular projection 3013 of the inner member 301. In this way, the outer member 302 whose diameter is larger than that of the inner member 301 is obtained.

In this embodiment, the disc plate 302*a* shown in FIG. 13 is obtained by punching a material plate. However, the through hole 3021 may be formed at the same time when the disc plate 302*a* is prepared by the punching process. In this case, the outer member 302 is obtained only by forming the annular wall 3022 along the outer periphery of the disc plate 302*a*.

Figure 16:
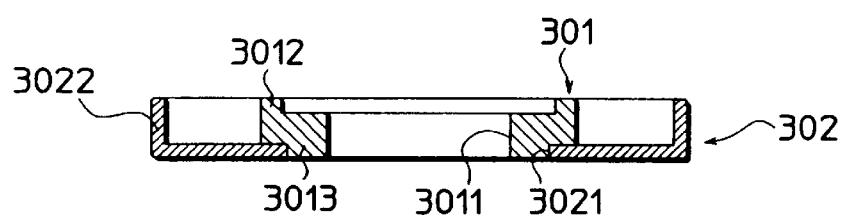
FIG. 16 is a cross sectional view showing a combination of the inner member and the preliminary outer member.
Figure 17:
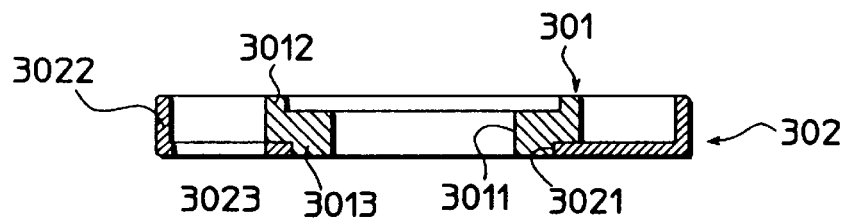
FIG. 17 is a cross sectional view of the rotor, the outer member being formed with holes.

The rotor 30 is produced as shown in FIGS. 16 and 17 by integrally assembling the thus produced inner member 301 and the thus produced outer member 302. First, as shown in FIG. 16, the inner member 301 is arranged in the outer member 302, and the second annular projection 3013 of the inner member 301 is fitted in the through hole 3021 of the outer member 302. Subsequently, the inner member 301 is integrally connected with the outer member 302 by pressing a die against an outer periphery of the second annular projection 3013 of the inner member 301 to deform the periphery.

Subsequently, as shown in FIG. 17, the outer member 302 is punched to form holes 3023, 3024, 3025. In FIG. 17, only the hole 3023 is shown. Finally, the overall surface of the inner and outer members 301 and 302 is applied with a plating layer. In this way, the rotor 30 is produced.

The holes 3023, 3024, 3025 may be formed in advance at the time of forming the disc plate 302*a* in the stage of FIG. 13 or at the time of forming the through hole 3021 in the stage of FIG. 15. Alternatively, all the holes may be formed in advance at the time of forming the disc plate 302*a*. In the latter case, the disc plate formed with the through hole 3021 and holes 3023 to 3025 is regarded as the outer member.

Further, the inner member 301 and the outer member 302 may be integrally connected with each other not by means of caulking tool but with the use of adhesive agent. Alternatively, the inner member 301 may be integrally connected with the outer member 302 by making the diameter of the second annular projection 3013 of the inner member 301 slightly larger than that of the through hole 3021 of the outer member 302, and forcibly inserting the second annular projection 3013 in the through hole 3021.

Further, it may be appreciated to use as material plate for the outer member 302 a steel plate covered with a metal layer, e.g., zinc-galvanized steel. This will eliminate the plating of the outer member 302. Accordingly, only the inner member 301 is required to be plated. Also, comparing to the case of plating the overall exposed surface of the rotor 30 which accompanies the drawback that the deposit layer is likely damaged due to the large size and heavy weight, and the adoption of plating method favorable for mass production, e.g., barrel plating, is thus difficult, the use of plated steel plate as outer member material will reduce the plating process into only the inner member 301, and make it possible to perform the plating favorable for mass production, e.g., barrel plating, which increases the productivity of rotors.

As mentioned above, the rotor 30 is constructed by the inner member 301 and the outer member 302 which are produced separately. Accordingly, each part can be produced in a simpler manner. Thus, compared to the rotor formed from a single material, the production manner can be simplified, and hence the production costs of rotor can be reduced.

The electromagnetic clutch 50 including the thus constructed rotor 30 is operated similarly to the electromagnetic clutch 10 of the first embodiment. Specifically, when the coil is energized, a flux of magnetic induction is generated around the energized coil 16 and along a magnetic path defined by the field member 12, shaft 29, and the rotor 30. The rotor 30 attracts the armature member 18 against the biasing force of the spring 21 by the leakage flux passed through the holes 3023, 3024, and 3025 of the rotor 30. Consequently, the rotor 30 rotates together with the driving member 20, and accordingly, the shaft 29 rotates together with the rotor 30 since the rotor 30 is fixedly secured to the shaft 29. On the other hand, when the coil 16 is deenergized, the magnetic attraction of the coil 16 disappears, and the rotation of the shaft 29 is stopped.

It should be appreciated that the shaft 13 of the electromagnetic clutch 10 in the first embodiment can be used in the electromagnetic clutch 50 of the second embodiment. In this case, the production cost of both the shaft and the rotor can be reduced to thereby further reduce the production costs of electromagnetic clutch.

Figure 18:
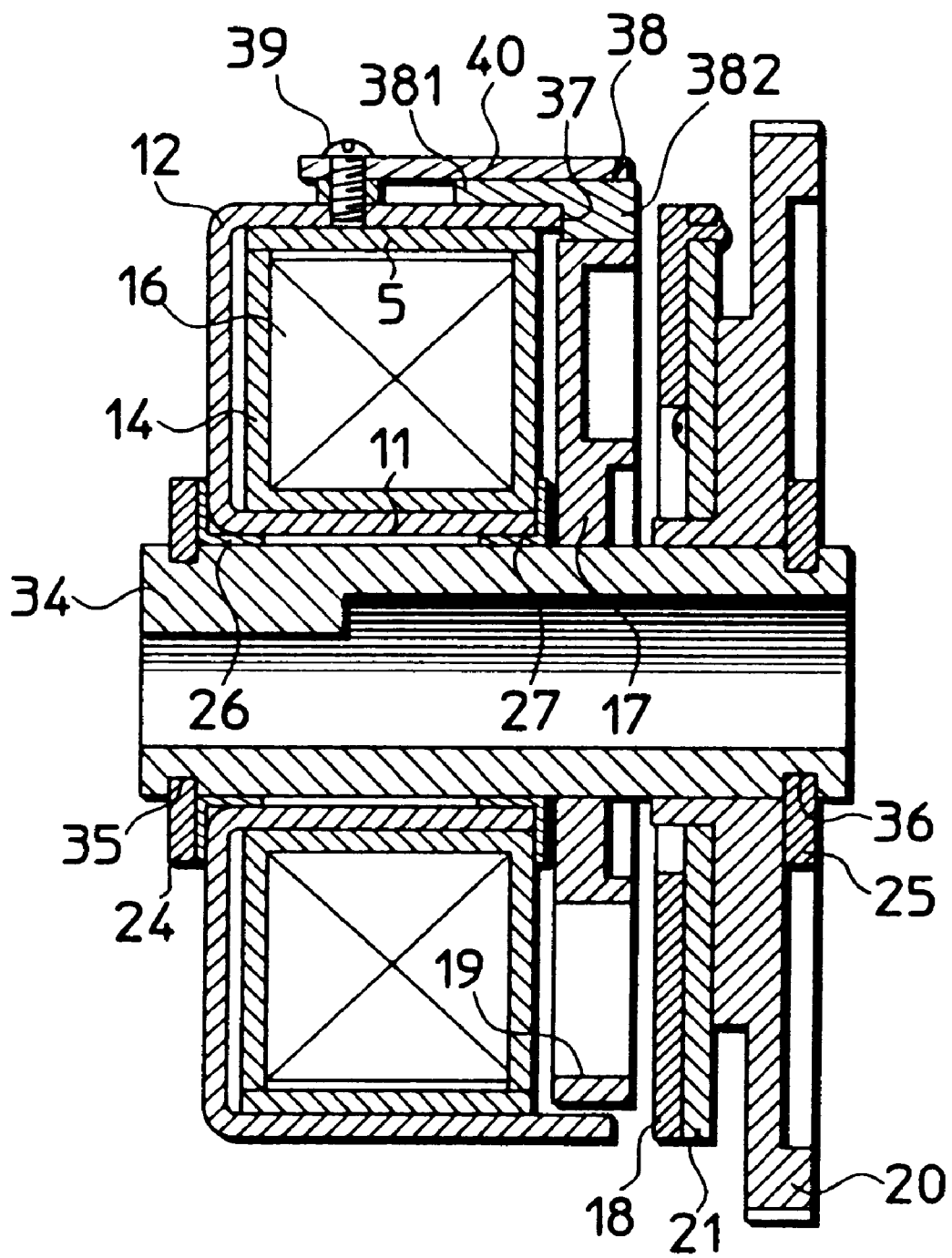
FIG. 18 is a cross sectional view of an electromagnetic clutch as a third embodiment according to the present invention.

FIG. 18 is a vertical cross sectional view of an electromagnetic clutch as a third embodiment of this invention. In FIG. 18, indicated at 60 is an electromagnetic clutch. Since the electromagnetic clutch 60 has a construction basically identical to that of the electromagnetic clutch 10 in the first embodiment, elements of the electromagnetic clutch 60 identical to those of the electromagnetic clutch 10 are indicated at the same reference numerals, and a detailed description of the elements common to the first and third embodiments is omitted.

The electromagnetic clutch 60 has a field member 12 including a hollow portion 11. A shaft 34 in the form of a cylinder is rotatably inserted in the hollow portion 11. A field coil 16 is wound around the hollow portion 11. A rotor 17 is fixedly mounted on the shaft 34. An armature member 18 is rotatably mounted on the shaft 34. A driving member 20 is rotatably mounted on the shaft 34. The armature member 18 and the driving member 20 are integrally connected with each other. The armature member 18 is biased toward the driving member 20 by a spring 21 when the field coil is not energized.

The shaft 34 is formed with grooves 35, 36 in both ends thereof. Stopper rings 24, 25 are fitted in the grooves 35, 36, respectively to prevent the parts from slipping off from the shaft 34. The hollow portion 11 is provided with bearings 26, 27 on its both ends.

Figure 19:
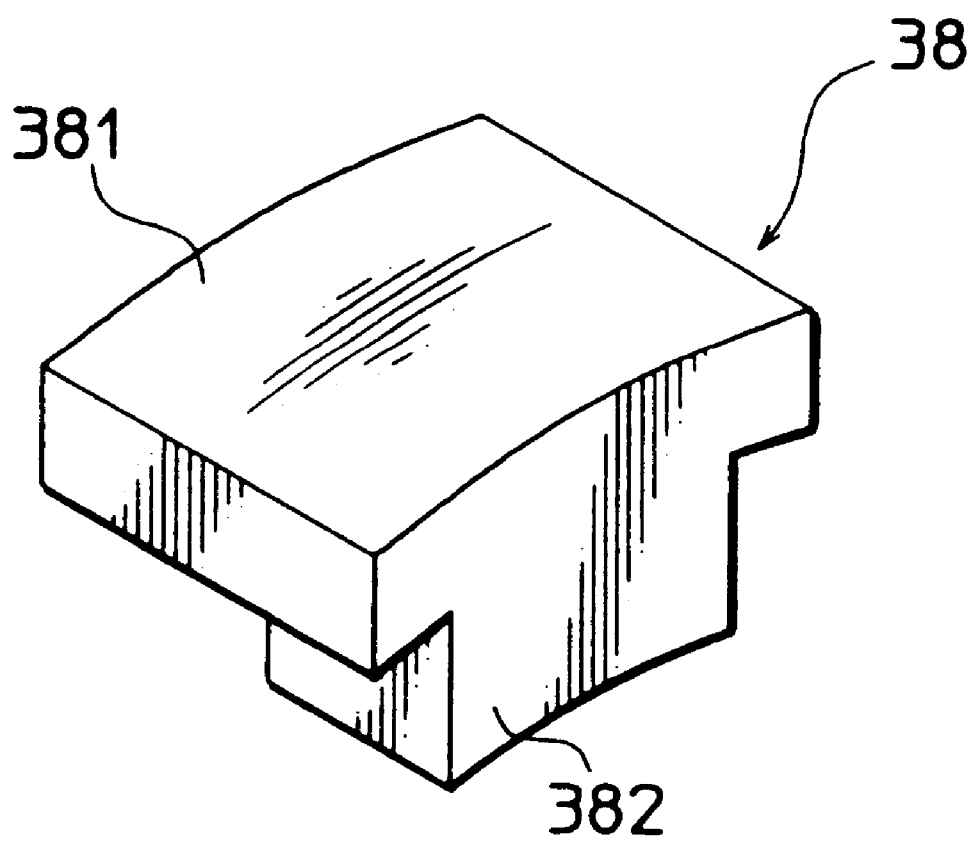
FIG. 19 is a perspective view of a brake member incorporated in the third electromagnetic clutch according to the present invention.
Figure 20:
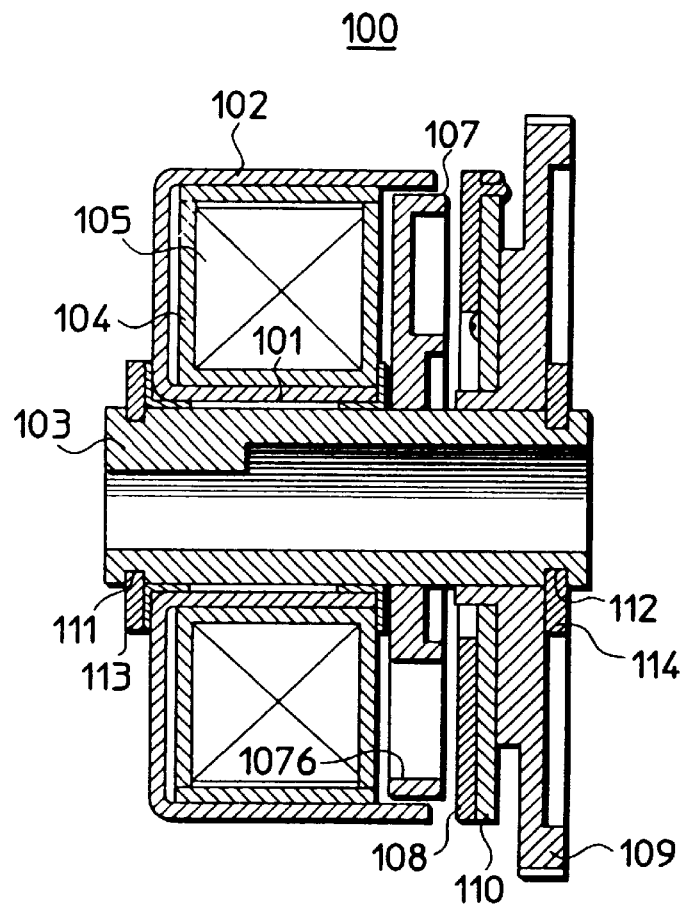
FIG. 20 is a cross sectional view of a conventional electromagnetic clutch in the prior art.
Figure 21:
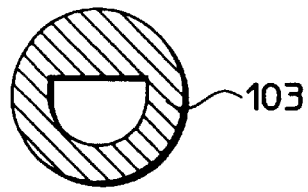
FIG. 21 is a cross sectional view of a shaft incorporated in the conventional clutch shown in FIG. 20.
Figure 22:
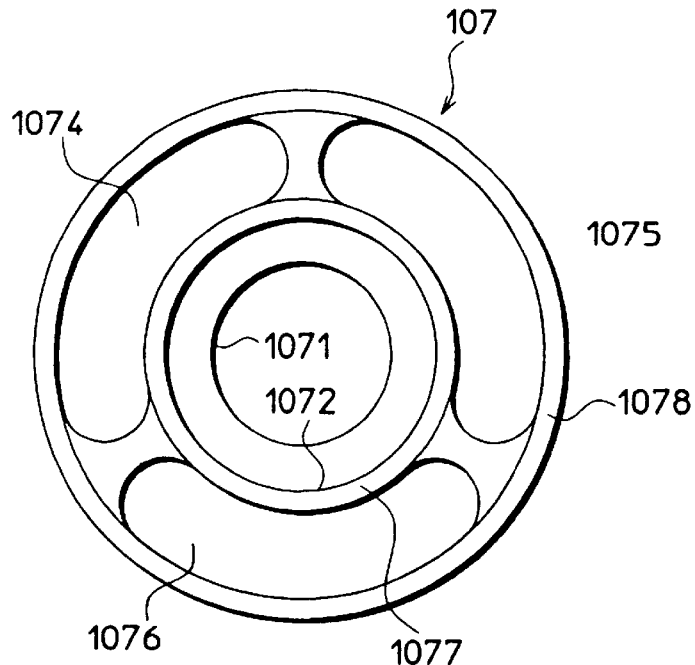
FIG. 22 is a front view of a rotor incorporated in the conventional clutch shown in FIG. 20.
Figure 23:
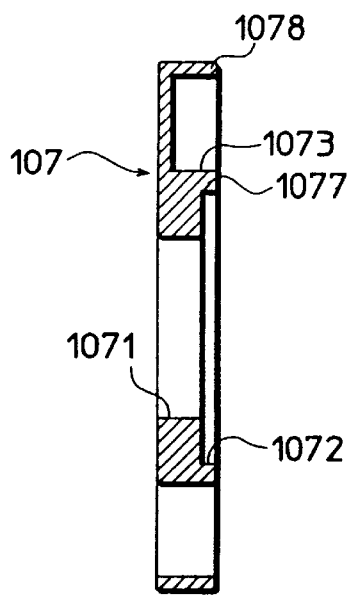
FIG. 23 is a cross sectional view of the rotor shown in FIG. 22.

The field member 12 is formed with a cut-away portion 37 in an opening end thereof. A brake member 38 is placed in the cut-away portion 37. The brake member 38 is formed of a synthetic resin and the like. As shown in FIG. 19, an enlarged view of the brake member 38, the brake member 38 is formed with a mounting portion 381 to be fittingly mounted on the field member 12 and a contact portion 382 to be brought into sliding contact outer circumference of the rotor 17. A bottom surface of the mounting portion 381 coming into contact with an outer circumference of the field member 12 is curved into an arc in correspondence to the shape of the outer circumference of the field member 12. A bottom surface of the contact portion 382 is curved into an arc in correspondence to the shape of the outer circumference of the rotor 17.

The thus formed brake member 38 is fittingly placed in the cut-away portion 37 of the field member 12 in the state that the bottom surface of the mounting portion 381 is in contact with an outside surface of the field member 12. Further, the brake member 38 is pushed downward by a spring member 40. The spring member 40 is fixedly secured to the field member 12 with a screw 39. The spring member 40 pushes the brake member 38 downward, thereby bringing the contact portion 382 of the brake member 38 into contact with the outer circumference of the rotor 17.

The thus constructed electromagnetic clutch 60 is operated similarly to the electromagnetic clutch 10 in the first embodiment. Specifically, when the coil 16 is energized, a flux of magnetic induction is generated around the energized coil 16 and along a magnetic path defined by the field member 12, shaft 34, and the rotor 17. The rotor 17 attracts the armature member 18 against the biasing force of the spring 21 by leakage magnetic flux passed through holes 19. The rotor 17 rotates together with the driving member 20, and the shaft 34 rotates together with the rotor 17 since the rotor 17 is fixedly secured to the shaft 34. On the other hand, when the coil 16 is deenergized, the magnetic attraction disappears, and the rotation of the shaft 34 is stopped.

In response to deenergization of the coil 16, the shaft 34 is immediately stopped by the brake member 38 in contact with the rotor 17. In this way, the shaft 34 can reliably stopped at a specified position and has its stationary state maintained at the stop position. Since the contact state between the rotor 17 and the contact portion 382 of the brake member 38 is ensured by the spring member 40, there is no likelihood that the integral rotation of the rotor 17 together with the driving member 20 when the clutch 60 is turned off.

In place of the spring member 40, the mounting of the brake member 38 on the field member 12 may be accomplished by adhesive agent or by directly fixing the mounting portion 381 of the brake member 38 on the field member 12 with a screw. Further, it may be appreciated that the field member 12 is formed with a through hole in place of the cut-away portion 37 and the contact portion 382 of the brake member 38 is formed into a shape corresponding to the through hole formed in the field member 12.

Further, the contact surface of the contact portion 382 of the brake member 38 may be formed into such a shape, e.g., a tapered shape or wedged shape, as to apply little braking force to the rotor 17 when the rotor 17 rotates in a forward direction and apply a great braking force to the rotor 17 when the rotor 17 rotates in a reverse direction. This will more reliably stop or keep the rotor at a target position.

The brake member 38 of the electromagnetic clutch 60 in the third embodiment can be also used in the electromagnetic clutch 10 in the first embodiment, in the electromagnetic clutch 50 in the second embodiment, or in the electromagnetic clutch 50 provided with the shaft 13 which is incorporated in the electromagnetic clutch 10.

Further, the shafts 13, 29, 34 of the electromagnetic clutches 10, 50, 60 each constitute a part of a magnetic path along which magnetic flux is induced. Alternatively, the shaft 29 of the electromagnetic clutch 50 (or the shaft 34 of the electromagnetic clutch 60) may be formed of material other than metallic material, e.g., synthetic resin having no magnetism and the magnetic path may be constituted by members other than the shaft 29 (34).

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An electromagnetic clutch, comprising:
    a field member having a hollow in a center thereof and carrying a field coil in the form of a ring;
    a shaft rotatably placed in the hollow of the field member;
    a rotor member fixedly attached on the shaft, the rotor member being arranged on one side of the field member, the rotor member including an inner member in the form of a ring and an outer member in the form of a ring, the outer member being formed with a through hole in a center thereof, the inner member being press-fit in the through hole of the outer member;
    a driving member rotatably mounted on the shaft, the driving member being arranged on one side of the rotor member; and
    an armature member attached to the driving member, the armature member being arranged between the rotor member and the driving member, and bendable toward the rotor member and contactable with the outer member.

2. An electromagnetic clutch according to claim 1, wherein the shaft includes an inner cylinder member comprised of a synthetic resin and formed with a hollow extending along an axis thereof, the hollow being operable to engage with a torque transmission shaft of a device to be connected with the electromagnetic clutch and having an irregular shape portion for keeping the torque transmission shaft to rotate together with the inner cylinder member, and an outer cylinder member placed over the inner cylinder member, the outer cylinder member being comprised of a ferromagnetic material.

3. An electromagnetic clutch according to claim 1, further comprising a brake member fixedly secured to the field member and operable to come into contact with the rotor member.

4. An electromagnetic clutch according to claim 1, wherein the inner member includes an annular projection, and an outer periphery of the outer projection is press-fit into the through hole of the outer member.

5. An electromagnetic clutch according to claim 1, wherein the inner member is formed with a first annular projection along an outer periphery on one side surface thereof and a second annular projection along a periphery of the through hole on the other side surface thereof, the through hole of the outer member being engageable with the second annular projection of the inner member.

6. An electromagnetic clutch, comprising:
    a field member having a hollow in a center thereof and carrying a field coil in the form of a ring;
    a shaft rotatably placed in the hollow of the field member;
    a rotor member fixedly attached on the shaft, the rotor member being arranged on one side of the field member, the rotor member including an inner member in the form of a ring and an outer member in the form of a ring, the outer member being larger than the inner member;
    a driving member rotatably mounted on the shaft, the driving member being arranged on one side of the rotor member;
    an armature member attached to the driving member, the armature member being arranged between the rotor member and the driving member, and bendable toward the rotor member and contactable with the outer member; and
    the inner member being formed with a through hole in a center thereof, a first annular projection along an outer periphery on one side surface thereof, and a second annular projection along a periphery of the through hole on the other side surface thereof, and the outer member being formed with an annular wall along an outer periphery thereof, and a through hole in a center thereof, the through hole of the outer member being engageable with the second annular projection of the inner member, the outer member being formed with a hole between the annular projection and the through hole.

7. An electromagnetic clutch according to claim 6, wherein the inner member and the outer member are fixedly connected with each other by deforming the second annular projection of the inner member.

8. An electromagnetic clutch, comprising:
    a field member having a hollow in a center thereof and carrying a field coil in the form of a ring;
    a shaft rotatably placed in the hollow of the field member;
    a rotor member fixedly attached of the shaft, the rotor member being arranged on one side of the field member, the rotor member including an inner member in the form of a ring and an outer member on the form of a ring, the outer member having a larger outer diameter than the inner member, each of the inner member and the outer member presenting cooperating structure for permitting interference-fit engagement therebetween;
    a driving member rotatably mounted on the shaft, the driving member being arranged on one side of the rotor member; and
    an armature member attached to the driving member, the armature member being arranged between the rotor member and the driving member, said armature member being bendable toward the rotor member and contactable with the outer member.

9. A rotor member for use in an electromagnetic clutch of the type including a field member carrying a ring-shaped field coil, a shaft rotatably received through the field member, a driving member rotatably mounted on the shaft, an armature member attached to the driving member, the armature member being arranged between the rotor member and the driving member and bendable toward the rotor member, and in which the rotor member is fixedly attached on the shaft and arranged on one side of the field member, the rotor member comprising:
    an inner member in the form of a ring and an outer member in the form of a ring, the outer member having a larger outer diameter than the inner member, each of the inner and outer members presenting cooperating structure for permitting interference-fit engagement therebetween for mutual securement one to another, at least a portion of said rotor member being collectively defined by said inner and outer members when secured together said armature member being contactable with the outer member.

10. An electromagnetic clutch, comprising:
    a field member having a hollow in a center thereof and carrying a field coil in the form of a ring;
    a shaft rotatably placed in the hollow of the field member;

a rotor member fixedly attached on the shaft, the rotor member being arranged on one side of the field member, the rotor member including an inner member in the form of a ring and an outer member in the form of a ring, the outer member being formed with a through hole in a center thereof, the inner member being press-fit in the through hole of the outer member, each of said inner and outer members being comprised of ferromagnetic material;

a driving member rotatably mounted on the shaft, the driving member being arranged on one side of the rotor member; and an armature member attached to the driving member, the armature member being arranged between the rotor member and the driving member and bendable toward the rotor member.

11. An electromagnetic clutch according to claim 10, wherein the inner member includes an annular projection, and an outer periphery of the outer projection is press-fit into the through hole of the outer member.

12. An electromagnetic clutch according to claim 10, wherein the inner member is formed with a first annular projection along an outer periphery on one side surface thereof and a second annular projection along a periphery of the through hole on the other side surface thereof, the through hole of the outer member being engageable with the second annular projection of the inner member.

13. An electromagnetic clutch according to claim 10, wherein the shaft includes an inner cylinder member comprised of a synthetic resin and formed with a hollow extending along an axis thereof, the hollow being operable to engage with a torque transmission shaft of a device to be connected with the electromagnetic clutch and having an irregular shape portion for keeping the torque transmission shaft to rotate together with the inner cylinder member, and an outer cylinder member placed over the inner cylinder member, the outer cylinder member being comprised of a ferromagnetic material.

14. An electromagnetic clutch according to claim 10, further comprising a brake member fixedly secured to the field member and operable to come into contact with the rotor member.

15. An electromagnetic clutch, comprising:

a field member having a hollow in a center thereof and carrying a field coil in the form of a ring;

a shaft rotatably placed in the hollow of the field member;

a rotor member fixedly attached on the shaft, the rotor member being arranged on one side of the field member, the rotor member including an inner member in the form of a ring and an outer member in the form of a ring, the outer member being larger than the inner member, each of said inner and outer members being comprised of ferromagnetic material;

a driving member rotatably mounted on the shaft, the driving member being arranged on one side of the rotor member;

an armature member attached to the driving member, the armature member being arranged between the rotor member and the driving member and bendable toward the rotor member; and the inner member being formed with a through hole in a center thereof, a first annular projection along an outer periphery on one side surface thereof, and a second annular projection along a periphery of the through hole on the other side surface thereof, and the outer member being formed with an annular wall along an outer periphery thereof, and a through hole in a center thereof, the through hole of the outer member being engageable with the second annular projection of the inner member, the outer member being formed with a hole between the annular projection and the through hole.

16. An electromagnetic clutch according to claim 15, wherein the inner member and the outer member are fixedly connected with each other by deforming the second annular projection of the inner member.

17. An electromagnetic clutch comprising:

a field member having a hollow in a center thereof and carrying a field coil in the form of a ring;

a shaft rotatably placed in the hollow of the field member;

a rotor member fixedly attached on the shaft, the rotor member being arranged on one side of the field member, the rotor member including an inner member in the form of a ring and an outer member in the form of a ring, the outer member having a larger outer diameter than the inner member, each of the inner and outer members being comprised of ferromagnetic material and presenting cooperating structure for permitting interference-fit engagement therebetween;

a driving member rotatably mounted on the shaft, the driving member being arranged on one side of the rotor member; and an armature member attached to the driving member, the armature member being arranged between the rotor member and the driving member and bendable toward the rotor member.

18. A rotor member for use in an electromagnetic clutch of the type including a field member carrying a ring-shaped field coil, a shaft rotatably received through the field member, a driving member rotatably mounted on the shaft, an armature member attached to the driving member, the armature member being arranged between the rotor member and the driving member and bendable toward the rotor member, and in which the rotor member is fixedly attached on the shaft and arranged on one side of the field member, the rotor member comprising:

an inner member in the form of a ring and an outer member in the form of a ring, the outer member having a larger outer diameter than the inner member, each of the inner and outer members presenting cooperating structure for permitting interference-fit engagement therebetween for mutual securement one to another, at least a portion of said rotor member being collectively defined by said inner and outer members when secured together, each of said inner and outer members being comprised of ferromagnetic material.

* * * * *